(12) United States Patent
Corpora

(10) Patent No.: US 10,566,101 B2
(45) Date of Patent: Feb. 18, 2020

(54) APPARATUS FOR DEGASSING A NUCLEAR REACTOR COOLANT SYSTEM

(71) Applicant: Westinghouse Electric Company LLC, Cranberry Township, PA (US)

(72) Inventor: Gary J. Corpora, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 580 days.

(21) Appl. No.: 15/407,508

(22) Filed: Jan. 17, 2017

(65) Prior Publication Data

US 2017/0229201 A1    Aug. 10, 2017

Related U.S. Application Data

(63) Continuation of application No. 14/612,461, filed on Feb. 3, 2015, now abandoned.

(51) Int. Cl.

| | |
|---|---|
| *G21C 19/42* | (2006.01) |
| *G21F 9/06* | (2006.01) |
| *G21C 19/307* | (2006.01) |
| *G21F 9/02* | (2006.01) |
| *B01D 19/00* | (2006.01) |
| *G21C 15/00* | (2006.01) |
| *G21C 19/20* | (2006.01) |

(52) U.S. Cl.
CPC ............ *G21F 9/06* (2013.01); *B01D 19/0031* (2013.01); *B01D 19/0036* (2013.01); *G21C 15/00* (2013.01); *G21C 19/307* (2013.01); *G21F 9/02* (2013.01); *G21C 19/207* (2013.01)

(58) Field of Classification Search
CPC ... G21C 9/00; G21C 9/04; G21C 9/06; G21C 19/28; G21C 19/30; G21C 19/303
See application file for complete search history.

(56) References Cited

U.S. PATENT DOCUMENTS

| | | | |
|---|---|---|---|
| 3,037,922 A | 6/1962 | Johnson | |
| 3,630,915 A | 12/1971 | Sullivan et al. | |
| 3,944,466 A | 3/1976 | Marchese | |
| 3,957,597 A | 5/1976 | Maroni | |
| 3,975,170 A * | 8/1976 | Keating, Jr. ........... | B01D 53/22 95/23 |
| 4,235,863 A | 11/1980 | Schulten et al. | |
| 4,430,293 A | 2/1984 | Callaghan et al. | |
| 4,647,425 A * | 3/1987 | Battaglia ................ | G21C 19/30 376/308 |
| 4,990,054 A | 2/1991 | Janocko | |
| 5,149,493 A | 9/1992 | Latge | |
| 6,217,634 B1 | 4/2001 | Dominelli et al. | |
| 6,899,744 B2 | 5/2005 | Mundschau | |
| 7,470,350 B2 | 12/2008 | Bonnett et al. | |

(Continued)

FOREIGN PATENT DOCUMENTS

| | | |
|---|---|---|
| CN | 103405945 | 11/2013 |
| JP | S5437012 A | 3/1979 |

(Continued)

*Primary Examiner* — Marshall P O'Connor
(74) *Attorney, Agent, or Firm* — Joseph C. Spadacene; Westinghouse Electric Company LLC

(57) ABSTRACT

An in-line dissolved gas removal membrane-based apparatus for removing dissolved hydrogen and fission gases from the letdown stream from a reactor coolant system.

7 Claims, 3 Drawing Sheets

(56) References Cited

U.S. PATENT DOCUMENTS

| | | |
|---|---|---|
| 7,700,184 B2 | 4/2010 | Harold et al. |
| 8,182,590 B2 | 5/2012 | Striemer et al. |
| 8,414,685 B2 | 4/2013 | Konopka |
| 2004/0025696 A1 | 2/2004 | Varrin, Jr. et al. |
| 2009/0130477 A1 | 5/2009 | Hou et al. |
| 2012/0055330 A1 | 3/2012 | Konopka |
| 2013/0115156 A1 | 5/2013 | Ghirelli et al. |
| 2013/0180399 A1 | 7/2013 | Chantereau |

FOREIGN PATENT DOCUMENTS

| | | |
|---|---|---|
| JP | H02-293002 A | 12/1990 |
| JP | 2013049002 A | 3/2013 |
| JP | 2041-13175 | 1/2014 |

\* cited by examiner

APPARATUS FOR DEGASSING A NUCLEAR REACTOR COOLANT SYSTEM

CROSS REFERENCE TO RELATED APPLICATION

This application is a continuation application of U.S. Ser. No. 14/612,461, filed Feb. 3, 2015, entitled APPARATUS FOR DEGASSING A NUCLEAR REACTOR COOLANT SYSTEM.

BACKGROUND

1. Field

The present invention relates generally to a process for removing dissolved gasses from reactor coolant in a nuclear power plant and more particularly to apparatus for removing dissolved hydrogen and fission gases from the reactor coolant by passing the coolant over a membrane and extracting the gasses by applying a vacuum.

2. Related Art

During pressurized water reactor plant shutdowns, it is a common practice to drain the reactor coolant system to a level below the reactor vessel flange to the mid-plane of the reactor vessel coolant outlet nozzles. That mid-plane coincides with the mid-plane of the connecting "hot leg" piping leading to the steam generators. This drain-down permits inspection, testing and maintenance, during shutdown, of pumps, steam generators, support structures and other primary system components.

During reactor operation, some fission gases, e.g., xenon and krypton, created by the fission reactions occurring in the nuclear fuel, may enter the reactor coolant system and become dissolved in the reactor coolant. Subsequent to shut down, but before refueling and maintenance operations commence, the concentration of radioactive gases and hydrogen must be reduced to avoid excessive radiation exposure to plant maintenance inspection personnel and reduce the likelihood of an explosion due to a potential spark setting off a flammable mixture of air and hydrogen in the containment atmosphere.

Reactor coolant has previously been degassed using a volume control tank connected to the reactor coolant system. Generally, the reactor coolant system primarily includes such nuclear steam supply system components as the reactor vessel, the steam generators, the reactor coolant pumps and the connecting piping. The volume control tank is part of the system known as the chemical and volume control system which operates in the degassing mode by flashing the dissolved hydrogen and radioactive gases out of the reactor coolant and into the vapor space of the volume control tank. An example of such a system could be found in U.S. Pat. No. 4,647,425.

Typically, a relatively small flow of reactor coolant referred to as the letdown flow is diverted from the reactor coolant system and through the chemical and volume control system. This stream is first cooled then purified in a mixed bed demineralizer, filtered to remove dissolved ionic or suspended particulate material and passed to the volume control tank.

U.S. Pat. No. 4,647,425 proposes an improvement to this chemical and volume control system procedure and reduces the time required to effectively degas the reactor coolant. The method proposed by the patent provides for vacuum degassing a reactor coolant system. The method comprises draining down the reactor coolant system to approximately the mid-point of the hot leg and maintaining the reactor coolant system in an unvented condition during the drain-down operation. Any flashed reactor coolant in the primary side of the steam generator is then refluxed. As used in the above mentioned patent, flashed reactor coolant means liquid coolant which flashes into the steam phase as a result of lower ambient pressure. Refluxed means condensed and cooled. The bulk of the reactor coolant as well as the refluxed reactor coolant, are circulated through a residual heat removal system to cool the reactor coolant. A vacuum is drawn on the reactor coolant system to evacuate any gas stripped from the reactor coolant. Preferably, the step of draining the coolant system establishes a partial vacuum in the unvented reactor vessel and reactor coolant system during drain-down. The partial vacuum is sufficient to cause the reactor coolant to boil at the prevailing temperatures in the reactor coolant system whereby the degassing occurs during the drain-down step.

FIG. 1 shows one prior art embodiment of a vacuum degassing system 10 that is currently in use. The letdown flow enters the system at the inlet 12 and is directed to an inlet 14 of a degasifier column vessel 16 where it enters the interior of the vessel through a spray head 18. A vacuum is drawn on the vessel through conduit 20 by the degasifier vacuum pumps 36. Excess reactor coolant which is not evaporated is drawn from the vessel by discharge pumps 22, with pulse dampeners 24 employed to smooth out the pulses generated by the diaphragm discharge pumps 22. The coolant that is drawn through the discharge pumps 22 is exhausted to a holding tank 26 for return to the system or disposal. The water vapor and non-condensable gases that are separated from the coolant in the degasifier column 16 are routed through a demister 28 to remove any entrained coolant and conveyed to a vapor condenser 30 in which it is placed in heat exchange relationship with chilled water that enters and exits the vapor condenser through inlets and outlets 32 and 34. The radioactive gases and hydrogen are then drawn by vacuum pumps 36 to a degasifier separator 38. The separated coolant is then drawn off by the degasifier separator pumps 40 and discharged to the holding tank 26. The radioactive gas and hydrogen are vented from the degasifier separator 38 vapor space to the reactor plant radioactive waste gas system 42. The nitrogen purge line 44 is provided to purge any residual hydrogen and radioactive gases prior to maintenance.

This traditional approach requires significant energy to operate large vacuum pumps, multiple components, e.g., degasifier columns, transfer pumps, separator vessels, interconnecting piping, valves, and instrumentation, and requires significant building space and support systems, e.g., cooling/chilled water. Thus, while these systems have a long track record, further improvement is desired that will simplify the design, reduce the energy required to operate the system, the amount of building space that is required to house the system and reduce the capital and maintenance costs of the system.

SUMMARY

These and other objects are achieved by a nuclear reactor power plant sub-system for removing radioactive gases and hydrogen gas from a reactor coolant. The sub-system includes a contactor housing a membrane that divides an interior of the contactor housing into an inlet chamber and an outlet chamber, wherein the membrane has pores that pass the radioactive and the hydrogen gases from the inlet chamber to the outlet chamber, but prevent the reactor coolant from passing through to the outlet chamber. A vacuum generator is connected to the outlet chamber for drawing a vacuum on the outlet chamber. A liquid outlet conduit is connected to an outlet nozzle on the inlet chamber for conveying a degasified portion of the reactor coolant to a desired location. Similarly, a gas outlet conduit is connected to an outlet nozzle on the outlet chamber for conveying the radioactive and hydrogen gases to a nuclear reactor power plant waste gas system.

In one embodiment, a "sweep" gas system is connected to the outlet chamber for supplying a relatively small inert gas purge flow in the outlet chamber and preferably, the inert gas is nitrogen. The sweep gas, in combination with the application of a vacuum, enhances the efficiency of the membranes for dissolved gas removal, thus minimizing the required number of contactors. In still another embodiment, the contactor housing comprises a plurality of contactor housings connected in parallel. Alternately, the contactor housings may be connected in series. In still another embodiment, the contactor housing comprises a plurality of contactor housings with at least some of the plurality of contactor housings connected in parallel and some of the parallel connected contactor housings are connected in series with at least one other of the plurality of contactor housings. In still another embodiment, the contactors may be operated without a sweep gas, but may require additional contactors in series and/or parallel.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

This invention utilizes a known and established technology of gas membranes to remove dissolved gases from the reactor coolant. While this is a known and proven technology for some applications, it has not been previously employed to handle mildly acidic and radioactive solutions as exists in interfacing with the primary coolant of a nuclear reactor system, as evidenced by the alternative reactor degassing systems proposed in the past and described in the evaluation of prior art set forth in the Background of U.S. Pat. No. 4,647,425.

Figure 1:
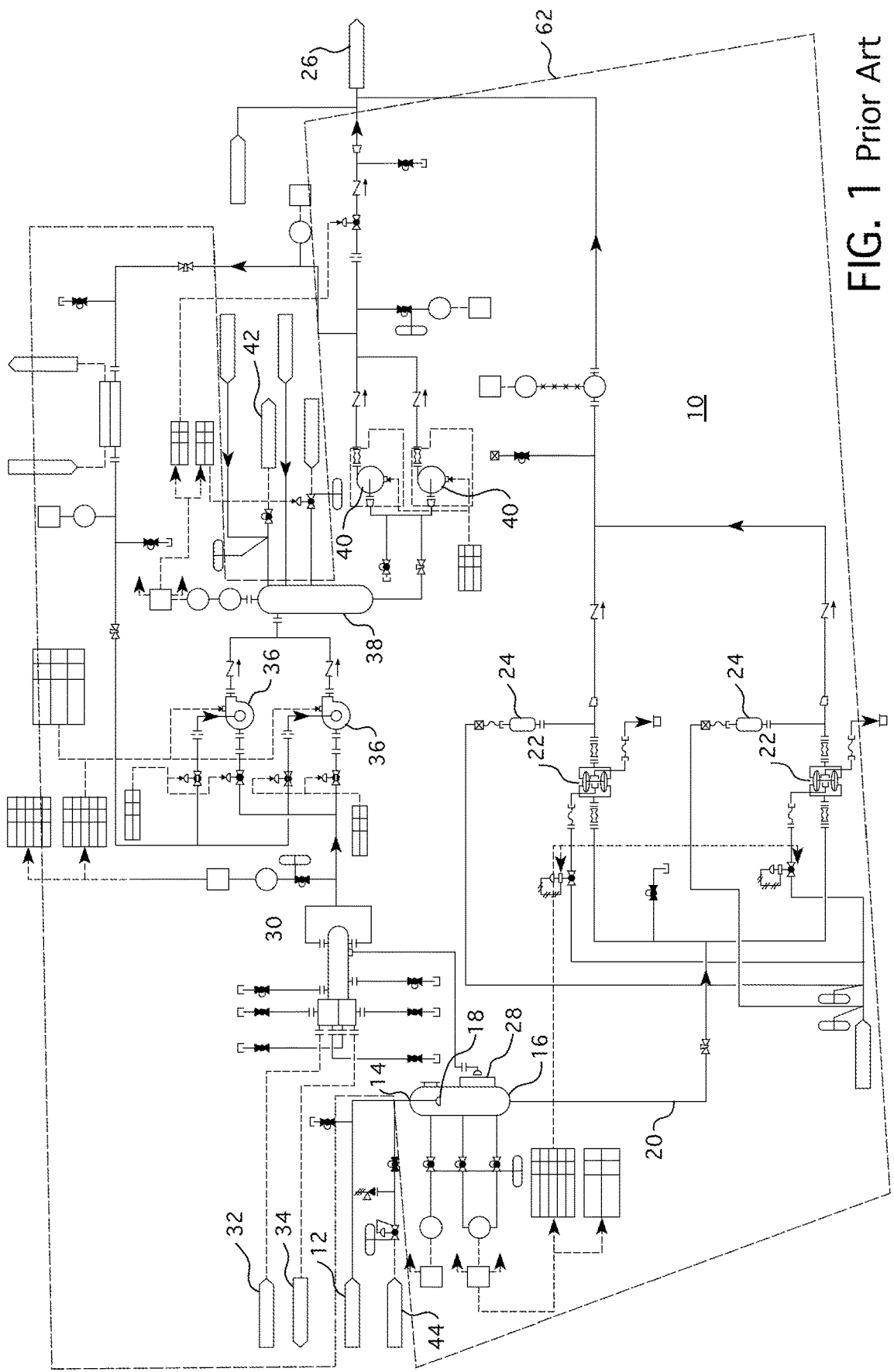
FIG. 1 is a schematic layout of a prior art vacuum degasification system.
Figure 2:
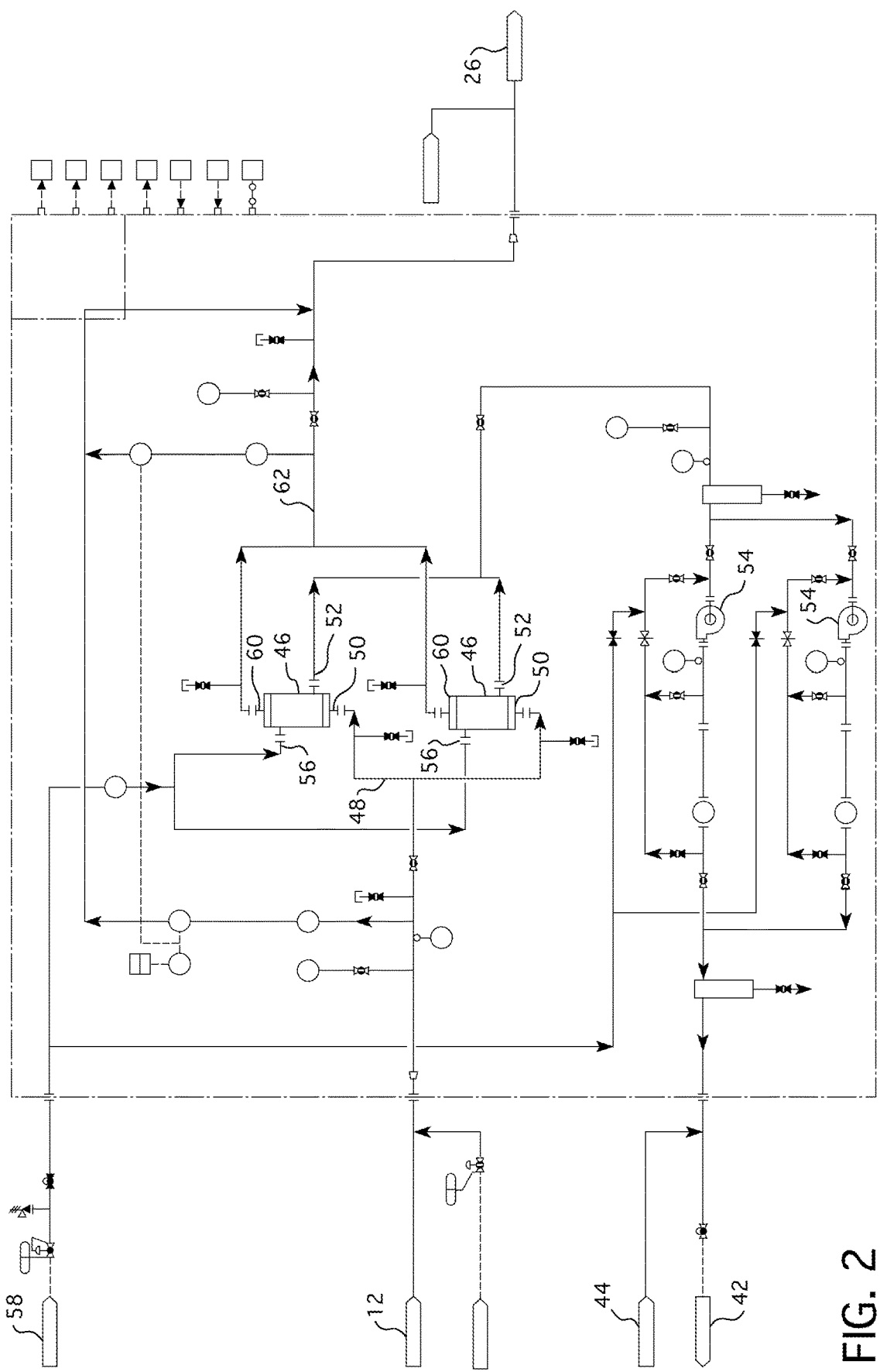
FIG. 2 is a schematic layout of one embodiment of the components of this invention that replace the portion of the system of FIG. 1 within the dotted lines.
Figure 3:
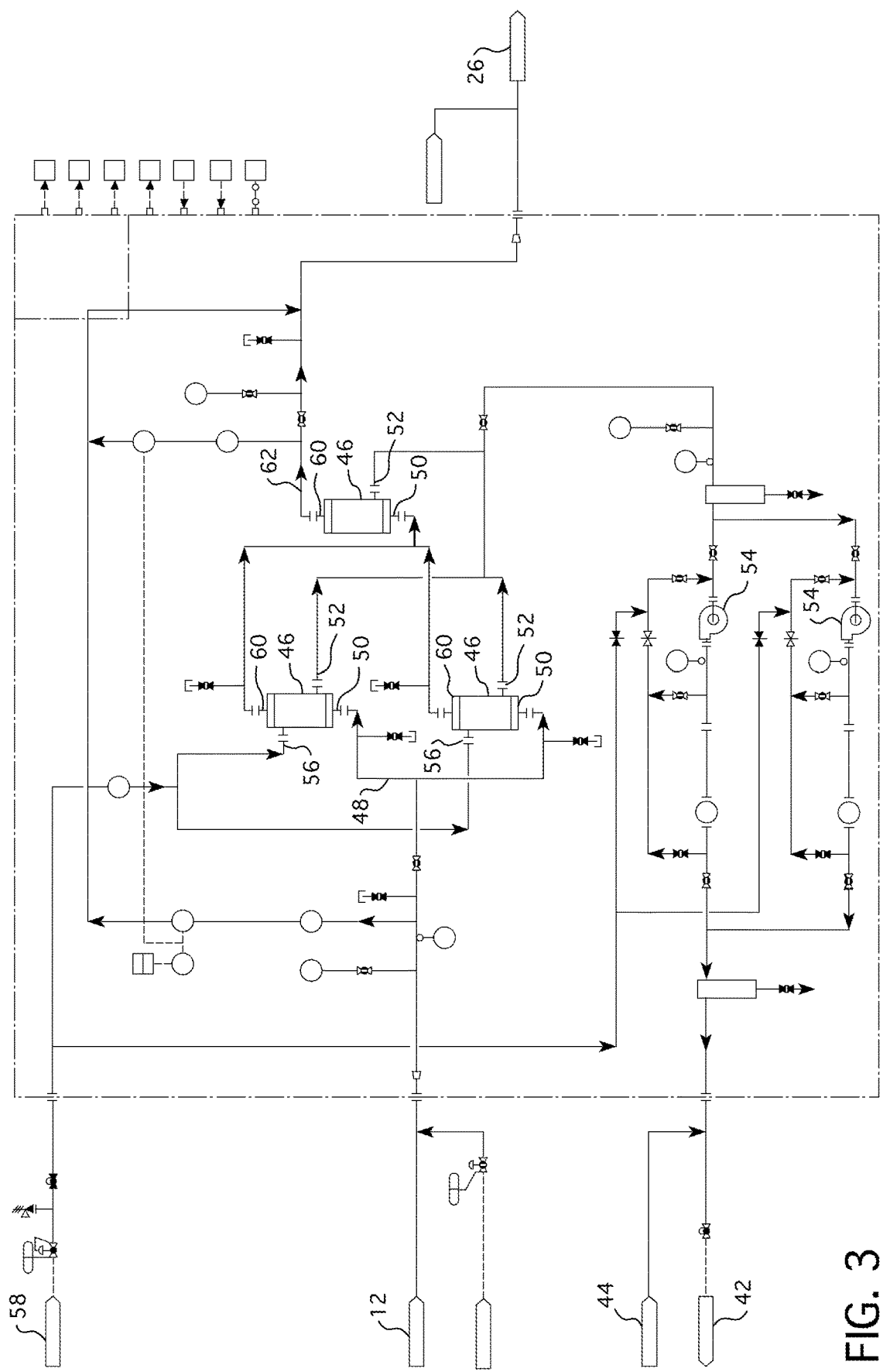
FIG. 3 is a schematic layout of the system of FIG. 2 with an additional contactor housing placed in series with the two parallel arrangements of contactor housings to further improve the quality of the output.

In accordance with this invention, one or more alternate "contactors" which respectively house a gas membrane are aligned in series and/or parallel, as required to handle the desired flow and the degree of gas removal. Liquid containing primarily dissolved hydrogen and the radioactive gases, i.e., xenon and krypton, enters the contactors at a relatively low pressure and exits the membranes degassed to the desired level. A vacuum is applied to the gas side of the membrane to pull dissolved gases from the liquid through tiny pores in the walls of the membrane. In addition, a small inert gas sweep gas, e.g., nitrogen, flow on the vacuum side is used to enhance dissolved gas removal. This gas flow minimizes the number of required contactors. Inlet and outlet dissolved hydrogen analyzers monitor the membranes' performance. Such a system is illustrated in FIGS. 2 and 3. FIG. 2 shows two contactors 46 in parallel though it should be appreciated that one, three or four or more contactors may be employed in parallel as necessary to handle the rate of flow that is required. FIG. 3 shows the two contactors in parallel as shown in FIG. 2, with a third contactor in series with the output of the two contactors in parallel to further reduce the amount of gases that may remain within the degassed coolant stream.

Referring back to FIG. 2, the letdown stream enters the system at the inlet 12 and is distributed through inlet conduit 48 to each of the inlets 50 on the contactors 46. A vacuum is applied to the gas side of the membrane at the gas outlet 52 by the vacuum pumps 54 and a small inert gas flow, preferably of nitrogen, is introduced at the gas inlets 56 from a nitrogen source 58. By "inert gas" is meant a gas that will not react with the stripped gasses, i.e., the radioactive gases or hydrogen, to form an undesirable or hazardous gas mixture when vented to the waste gas system. For example, helium gas may be used, whereas oxygen may not be used. The membrane within the contactor 46 has pores small enough to prevent the coolant from passing to the gas outlet 52, but large enough to enable the hydrogen and radioactive gases to pass through the membrane. Such contactors are available commercially, such as Liqui-Cel, available from Membrana Corporation, Charlotte, N.C. The degasified coolant then exits the contactor 46 at the outlet 60 and is conveyed by the outlet conduit 62 to a holding tank 26 where it can be returned to the reactor system or disposed of. As many contactors 46 can be arranged in parallel as necessary to handle as much volume of gas laden coolant as is needed to be recycled or disposed of. The extracted hydrogen and radioactive gases and the nitrogen sweep gas are then circulated by the vacuum pumps 54 to the plant radioactive gas waste system 42. The nitrogen source 58 also provides flow in the gas lines to purge the gas exit side of the system, for maintenance. A source of clean demineralized water 44 is provided for flushing of the liquid side of the contactors and piping prior to maintenance.

FIG. 3 is identical to FIG. 2 except an additional contactor 46 is positioned in series with the parallel arrangement of contactors 46 shown in FIG. 2 and provides another stage of degasification to enhance the purity of the coolant that exits the system. Sensors are provided throughout the system to monitor the efficacy of the process.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of removing radioactive gases and hydrogen gas from a nuclear reactor coolant comprising the steps of:
    diverting a portion of the reactor coolant to an inlet of an inlet chamber of a contactor housing having a membrane separating the inlet chamber from an outlet chamber, the membrane having pores that pass the radioactive gases and hydrogen gas, but not the reactor coolant, into the outlet chamber;
    drawing a vacuum on the outlet chamber;

providing a relatively small inert gas flow through the outlet chamber;

conveying the radioactive gases and hydrogen gas in the outlet chamber to a waste gas system; and transporting a portion of the reactor coolant that has been degassed through an outlet in the inlet chamber to a desired location.

2. The method of claim 1 wherein the inert gas is nitrogen.

3. The method of claim 1 wherein the inert gas is helium.

4. The method of claim 1 wherein the contactor housing comprises a plurality of contactor housings with the respective inlet chambers connected in parallel.

5. The method of claim 1 wherein the contactor housing comprises a plurality of contactor housings with the respective inlet chambers connected in series.

6. The method of claim 1 wherein the contactor housing comprises a plurality of contactor housings with at least some of the respective plurality of inlet chambers connected in parallel and some of the parallel connected inlet chambers connected in series with at least one other of the plurality of the contactor housings.

7. The method of claim 1 wherein the diverting step occurs during a nuclear reactor plant outage.

* * * * *